United States Patent
Czerwoniak et al.

[11] Patent Number: 6,131,743
[45] Date of Patent: Oct. 17, 2000

[54] SCREEN BASKET FOR FIBER SUSPENSIONS AND METHOD FOR THE PRODUCTION THEREOF

[75] Inventors: Erich Czerwoniak, Pfullingen; Wilhelm Hagen Hutzler, Reutlingen; Jochen Gustav Pfeffer, Eningen, all of Germany

[73] Assignee: Hermann Finckh Maschinenfabrik GmbH & Co., Germany

[21] Appl. No.: 09/464,922

[22] Filed: Dec. 16, 1999

Related U.S. Application Data

[63] Continuation of application No. PCT/EP98/03574, Jun. 13, 1998.

[30] Foreign Application Priority Data

Jun. 18, 1997 [DE] Germany .................... 197 25 737

[51] Int. Cl.[7] ...................................... B07B 1/49
[52] U.S. Cl. ................... 209/406; 209/405; 209/407; 29/515; 29/896.62; 29/522.1
[58] Field of Search ............................. 209/405, 406, 209/411, 393, 395, 409, 410, 273, 305; 210/497.01, 498; 29/896.62, 515, 522.1, 505

[56] References Cited

U.S. PATENT DOCUMENTS

| | | |
|---|---|---|
| 5,090,721 | 2/1992 | Lange . |
| 5,234,550 | 8/1993 | Ekholm et al. . |
| 5,394,600 | 3/1995 | Chen . |
| 5,611,399 | 3/1997 | Richard et al. ............... 29/896.62 |

FOREIGN PATENT DOCUMENTS

| | | |
|---|---|---|
| 2061290 | 5/1998 | Canada . |
| 19625726 | 6/1997 | Germany . |
| 0499154 | 8/1992 | WIPO . |

*Primary Examiner*—Donald P. Walsh
*Assistant Examiner*—Jonathan R. Miller
*Attorney, Agent, or Firm*—Leydig, Voit & Mayer, Ltd.

[57] ABSTRACT

A rotationally symmetrical screen for fiber suspensions with an inlet and outlet side, having a series of profiled bars which extend transversely to the circumferential direction of the screen, the cross-section of the profiled bars having a first end region facing away from the screen outlet side and a second end region facing away from the screen inlet side, and with metallic supporting rings lying in planes extending perpendicularly to the screen axis, each of the supporting rings having a series of cutouts open at their edge towards the screen inlet side, the shape of the cutouts corresponding to the configuration of the second cross-sectional end regions of the profiled bars lying in the cutouts, and forming an undercut in which a projection of the profiled bar cross section engages so that the profiled bars are held positively in a radial direction in relation to the screen axis and in the circumferential direction of the screen with their second cross-sectional end regions in the supporting ring cutouts; wherein the supporting rings are provided on the side of the profiled bars facing the screen outlet side with regions which are deformed such that as a result of a displacement of supporting ring material in the direction towards the screen inlet side, the profiled bar projections are pressed in this direction against the undercuts of the supporting ring outlets.

37 Claims, 9 Drawing Sheets

SCREEN BASKET FOR FIBER SUSPENSIONS AND METHOD FOR THE PRODUCTION THEREOF

This application is a continuation of U.S. PCT/EP98/03574 filed Jun. 13, 1998.

FIELD OF THE INVENTION

The invention relates to a screen for fiber suspensions having a shape which is essentially rotationally symmetrical in relation to a screen axis, with a first circumferential side of the screen forming an inlet side and the other, second circumferential side thereof forming an outlet side of the screen for the fiber suspension, with a series of profiled bars extending transversely to the circumferential direction of the screen, the profiled bars being arranged at equal spacings from one another in the circumferential direction of the screen and forming slot-shaped screen openings between them, and with at least two supporting rings lying in planes extending perpendicularly to the screen axis and being arranged in spaced relation to one another in the direction of the screen axis, each of the supporting rings having in its first edge region facing the screen inlet side a series of cutouts which are open at their edge towards the screen inlet side and into which the profiled bars are inserted in such a way that they project with part of their cross section in a radial direction over the first edges of the supporting rings.

BACKGROUND OF THE INVENTION

Such so-called bar screen baskets are known, in particular, from EP-B-0 417 408 and DE-A-39 27 748 corresponding thereto, from EP-A-0 499 154 and DE-A-41 04 615 corresponding thereto, and from EP-A-0 705 936.

These publications describe various methods for fixing the profiled bars in the cutouts of the supporting rings, and in all these bar screen baskets the inner circumference thereof forms the inlet side for the fiber suspension to be sorted.

To produce the bar screen basket according to EP-B-0 417 408 the cutouts open at their edge are produced in initially straight or only slightly bent profiled bar supports which are later bent to form closed supporting rings. The cutouts open at their edge have such a shape that they each form an undercut at a radial spacing from the first edge of the profiled bar supports into which the cutouts open, and the cross-sectional shape of the profiled bars is adapted to the configuration of the cutouts such that a projection of the profiled bar cross section engages in this undercut, and the profiled bars are thus held positively in the cutouts and are prevented from sliding out of the cutouts transversely to the longitudinal direction of the profiled bar supports. When the profiled bar supports are then bent into closed supporting rings the resulting narrowing of the cutouts causes the profiled bars to be clamped in the cutouts of the supporting rings. Both the profiled bar supports and the supporting rings of this known bar screen basket which are finally produced from these have a cross-sectional shape corresponding to a flat rectangle.

The bar screen basket according to EP-A-0 499 154 or DE-A-41 04 615 differs from this known bar screen basket only in that the configuration of the undercuts of the cutouts of the profiled bar supports and of the projections of the profiled bars engaging in these undercuts allows the profiled bars to be introduced transversely to their longitudinal direction into the open-edged cutouts of the profiled bar supports, which results in a type of snap closure, by means of which the profiled bars are prevented from sliding out of the cutouts of the profiled bar supports again transversely to their longitudinal direction. Therefore, whereas in the manufacture of the bar screen basket according to EP-B-0 417 408 the profiled bars are pushed into the cutouts of the profiled bar supports in their longitudinal direction, in the manufacture of the bar screen basket according to EP-A-0 499 154 the profiled bars are introduced into the cutouts of the profiled bar supports transversely to the longitudinal direction of the profiled bars. In the manufacture of the bar screen basket according to EP-A-0 499 154, too, the profiled bar supports are then bent into closed supporting rings and the profiled bars are thereby clamped in the cutouts.

In the bar screen basket according to EP-A-0 705 936, the profiled bars have a T-shaped cross section and the open-edged cutouts of the supporting rings have the shape of a rectangular slot into which there is inserted in the radial direction from the inside the rib of a profiled bar forming the foot of the T-shaped cross section. Clamping rings are then placed around the supporting rings so as to compress the supporting rings and thereby decrease the diameter in the radial direction, in order to clamp the aforementioned ribs of the profiled bars in the supporting ring cutouts.

Screen baskets with quite a different diameter are used in so-called sorters for fiber suspensions for the production of paper, cardboard and the like, but for cost reasons one endeavors to always use profiled bars which have identical cross-sectional shapes and cross-sectional dimensions. In the bar screen baskets according to EP-B-0 417 408 and EP-A-0 499 154, the size of the clamping forces by means of which the profiled bars are held firmly in the supporting rings does, however, depend to quite a considerable degree upon the diameter of the supporting rings into which the profiled bar supports are formed after insertion of the profiled bars into the open-edged cutouts of the profiled bar supports, unless one were to vary the configuration or dimensions of the cutouts to be produced in the profiled bar supports in dependence upon the diameter of the bar screen basket to be produced, a measure which naturally results in an increase in the manufacturing costs—cutouts designed independently of the screen basket diameter result in clamping forces which decrease progressively as the screen basket diameter increases. Furthermore, in the manufacture of the bar screen baskets known from EP-B-0 417 408 and EP-A-0 499 154, the profiled bars may shift in the longitudinal direction of the bars relative to the profiled bar supports, which may cause an obstruction during the bending of the profiled bar supports into closed supporting rings—it is only by this bending operation that the profiled bars are clamped in the cutouts, and, of course, in a finished bar screen basket the one or other ends of all profiled bars must lie in the same plane extending perpendicularly to the screen axis.

The fixing of the profiled bars in the supporting rings disclosed in EP-A-0 705 936 is presumably problematic not only because the attachment and closure of the clamping rings pressing the supporting rings radially inwardly appears difficult if sufficiently high clamping forces are to be generated, but, in addition, this known bar screen basket also necessitates manufacture and attachment of the clamping rings.

OBJECTS AND SUMMARY OF THE INVENTION

The object underlying the invention was to produce a bar screen basket and a method for its production which not only enable relatively simple fixing of the profiled bars in an accurate and lasting manner on the supporting rings but also open up the possibility of manufacturing screen baskets with quite a different diameter using profiled bars with one and the same cross section and profiled bar supports with one and the same cutout shape.

To achieve this object one departs from a screen for fiber suspensions having a shape which is essentially rotationally symmetrical in relation to a screen axis with a first circumferential side of the screen forming an inlet side and the other, second circumferential side thereof forming an outlet side of the screen for the fiber suspension, with a series of profiled bars which extend transversely to the circumferential direction of the screen, are arranged at equal spacings from one another in the circumferential direction of the screen and form slot-shaped screen openings between them, the cross sections of the profiled bars each having an elongate shape with a first end region facing away from the screen outlet side and a second end region facing away from the screen inlet side, and with at least two supporting rings made of a plastically deformable material, lying in planes extending perpendicularly to the screen axis and being arranged in spaced relation to one another in the direction of the screen axis, each of the supporting rings having in its first edge region facing the screen inlet side a series of cutouts open at their edge towards the screen inlet side, the shape of the cutouts—viewed in the direction of the screen axis—corresponding to the configuration of the second cross-sectional end regions of the profiled bars lying in the cutouts and forming at a radial spacing from the first edge of the supporting ring facing the screen inlet side an undercut in which a projection of the profiled bar cross section engages so that the profiled bars are held positively in a radial direction in relation to the screen axis and in the circumferential direction of the screen with their second cross-sectional end regions in the supporting ring cutouts, the profiled bars projecting in a radial direction over the first edges of the supporting rings, and being clamped with their second cross-sectional end regions in the supporting ring cutouts as a result of a plastic deformation of the supporting rings.

Such a screen is designed in accordance with the invention such that the supporting rings have on the side of the profiled bars facing the screen outlet side such plastically deformed regions that as a result of a displacement of supporting ring material in the direction towards the screen inlet side, the profiled bar projections are pressed in this direction against the undercuts.

Accordingly, when manufacturing an inventive screen basket, on the side of each profiled bar facing the screen outlet side, supporting ring material is displaced in the direction towards the adjacent profiled bar, more specifically, such that this profiled bar is thereby displaced somewhat by the displaced supporting ring material and/or by a displacement of that edge region of the cutout holding this profiled bar which faces the screen outlet side relative to the supporting ring in the direction towards the screen inlet side and is thereby pressed with its projection in this direction against the undercut formed by the supporting ring cutout and is thus also fixed precisely and lastingly in the radial direction of the screen basket. At the same time, the profiled bars previously pushed in their longitudinal direction into the cutouts are also fixed in the longitudinal direction of the bars.

As the inventive way of attaching the profiled bars on the supporting rings or on the profiled bar supports does not presuppose any definite design of the regions of the profiled bars projecting inwardly or outwardly in a radial direction in relation to the screen axis over the supporting rings, these regions can, in accordance with the invention, also be designed in a novel and particularly advantageous way:

In the known so-called bar screen baskets—on viewing a certain screen basket—all profiled bars are of identical design, and each profiled bar has the same cross section throughout its entire length. In contrast to this known design of the profiled bars, it is now proposed, in accordance with the invention, that profiled bars arranged one behind the other in the circumferential direction of the screen be designed differently at their first longitudinal sides facing away from the screen outlet side such that the profiled bars impart to a fiber suspension flowing in the circumferential direction of the screen at the screen inlet side an axial flow component oriented in the direction of the screen axis or increase such an axial flow component. For this purpose, the profiled bars could be provided at their aforementioned first longitudinal sides, for example, with grooves or ribs which form an acute angle with the circumferential direction of the screen and thus form conveying or deflecting surfaces disposed at an incline at the inlet side of the bar screen basket for the fiber suspension to be sorted circulating there.

When mention is made hereinabove of profiled bars arranged one behind the other in the circumferential direction of the screen, this is not to be interpreted so narrowly that all profiled bars or profiled bars following one another directly in the circumferential direction of the screen must be designed in accordance with the invention at their first longitudinal sides, although such configurations are preferred. The profiled bars do also not have to be designed in accordance with the invention over the entire length of the profiled bars at their first longitudinal sides, as it may, under certain circumstances, be sufficient to provide only in an axial section of the screen means which allow an axial flow component to occur or which increase such a flow component—the advantage achievable thereby will be explained hereinbelow.

Profiled bars to be used in accordance with the invention can be produced relatively simply when the profiled bars project at their first longitudinal sides section-wise to a varying extent over the first supporting ring edges. Profiled bars of such configuration can be produced, for example, from extruded profiled bars with the same cross section throughout by a machining, such as milling, being carried out section-wise. If the profiled bar sections projecting to a varying extent over the supporting rings are then arranged on the bar screen basket in the fashion of a helical pattern, they impart to a fiber suspension flowing in the circumferential direction of the screen at the screen inlet side not only an axial flow component oriented in the direction of the screen axis or cause an increase in such an axial flow component, but the profiled bar sections projecting over the supporting rings to a varying extent also bring about a loosening-up of the so-called rejected material, whereby the risk of damage to sorters containing bar screen baskets is reduced: In sorters for fiber suspensions, the inside circumference of the bar screen basket usually forms its inlet side, and inside the screen basket there rotates around the axis thereof a rotor which is provided with blades which move past the inlet side of the screen at a short distance therefrom, extend either parallel to the screen axis or form a small acute angle with the direction thereof and serve to generate positive and negative pressure pulses in the fiber suspension to be sorted at the inlet side of the screen. Fibers, fiber agglomerations and impurities contained in the fiber suspension to be sorted which do not pass through the screen openings of the screen basket (i.e. the so-called rejected material) have the tendency to collect at those flanks of the rotor blades which are located at the front in the direction of rotation, and such agglomerations of rejected material can result in breakage of the screen basket if they become "wedged" between a rotating rotor blade and the screen basket. In so-called pressure sorters into which the fiber to be sorted flows under pressure and in which the screen basket is acted upon at one axial end thereof with the fiber suspension to be sorted, while that part of the fiber suspension to be sorted which does not pass through the screen openings leaves the screen basket at its other axial end, the fiber suspension flowing along essentially in the circumferential direction of the screen under the influence of the rotor at the inlet side of the screen basket always also has an axial flow component oriented in the direction of the screen axis, namely on account of the above-described flow of the fiber suspension to be sorted into the screen basket, and due to the fact that the rejected material leaves the screen basket at its other end. Consequently, the above-described rejected material agglomerations travel along the rotor blades and increase more and more unless the rotor is not provided with continuous blades over its entire axial length, but—as known per se—has blade sections between which there are gaps and which are often also offset in relation to one another in the circumferential direction of the rotor. Similarly to these gaps between the blade sections of a rotor, the profiled bar sections arranged in accordance with the invention and projecting over the first supporting ring edges also result in a loosening-up of rejected material agglomerations and thus reduce the risk of damage to the bar screen basket.

The invention also relates to a method for the manufacture of a screen for fiber suspensions having a shape which is essentially rotationally symmetrical in relation to a screen axis, with a first circumferential side of the screen forming an inlet side and the other, second circumferential side thereof forming an outlet side of the screen for the fiber suspension, with a series of profiled bars extending transversely to the circumferential direction of the screen, the profiled bars being arranged at equal spacings from one another in the circumferential direction of the screen and forming slot-shaped screen openings between them, and the cross sections of the profiled bars each having an elongate shape with a first end region facing away from the screen outlet side and a second end region facing away from the screen inlet side, and with at least two ring-shaped profiled bar supports made of plastically deformable material lying in planes extending perpendicularly to the screen axis and arranged in spaced relation to one another in the direction of the screen axis, each of the profiled bar supports having in its first edge region facing the screen inlet side a series of cutouts open at their edge towards the screen inlet side, the shape of the cutouts—viewed in the direction of the screen axis—corresponding to the configuration of the second cross-sectional end regions of the profiled bars lying in the cutouts, and forming at a radial spacing from the first edge of the profiled bar support facing the screen inlet side an undercut in which a projection of the profiled bar cross section engages so that the profiled bars are held positively in a radial direction in relation to the screen axis and in the circumferential direction of the screen with their second cross-sectional end regions in the cutouts of the profiled bar supports and project with their first cross-sectional end regions in a radial direction over the first edges of the profiled bar supports, wherein the profiled bar supports are first provided with cutouts which are somewhat larger than the second cross-sectional end regions of the profiled bars and the profiled bars are then inserted into the profiled bar support cutouts and clamped by a plastic deformation of the profiled bar supports in their cutouts.

Such a process is configured in accordance with the invention such that the profiled bar supports are plastically deformed on the side of the profiled bars facing away from their first edges such that as a result of a displacement of profiled bar support material in the direction towards the first profiled bar support edges, the profiled bar projections are pressed in this direction against the undercuts.

When hereinabove mention is made of the fact that the profiled bar supports are first provided with cutouts which are somewhat larger than the second cross-sectional end regions of the profiled bars, this statement is not to be understood in the sense that the profiled bar support cutouts first have to be somewhat larger in each direction than the second cross-sectional end regions of the profiled bars as the inventive solution to the set object only makes it necessary to displace profiled bar support material in the direction towards the first profiled bar support edges in order to press the profiled bar projections in this direction against the undercuts formed by the profiled bar support cutouts.

As will be apparent from the aforesaid, in the manufacturing method according to the invention one can start with straight or only slightly bent profiled bar supports in whose cutouts the profiled bars are clamped by displacement of profiled bar support material, whereupon the profiled bar supports are bent to form closed rings. It is, however, equally possible to reshape the profiled bar supports with or without profiled bars into closed supporting rings and to only then fix the profiled bars inserted in the supporting ring cutouts by displacement of profiled bar support or supporting ring material in the cutouts. If the profiled bars are already fixed on the profiled bar supports which have not yet been reshaped into supporting rings, the advantage is gained over the prior art according to EP-B-0 417 408 and EP-A-0 499 154 that already before the bending of the profiled bar supports into closed supporting rings, a firm grid is obtained whose profiled bars can no longer shift relative to the profiled bar supports, more particularly, also not while the profiled bar supports are being reshaped into closed supporting rings.

The displacement of profiled bar support or supporting ring material to be carried out in accordance with the invention could, for example, be brought about by deforming by means of rolling the edge region of a profiled bar support or supporting ring facing away from the cutout openings and initially having a rectangular cross section between two pressure rolls with axes tilted in relation to one another and in relation to the plane of the supporting ring or profiled bar support such that the deformation brings about a displacement of material in the direction towards the profiled bars. Alternatively, one could coin, for example, using a coining die, in the immediate vicinity of each profiled bar on one or both sides of the supporting ring or profiled bar support in the latter a discrete recess for each profiled bar. However, embodiments are preferred wherein the deformed supporting ring or profiled bar support regions comprise pressed-in grooves which extend along the entire series of screen bars, in particular, in the immediate vicinity of the profiled bars.

In general, the supporting rings will consist of a suitable metal or a suitable metal alloy. It is, however, in principle, also possible to use instead a plastic material sufficiently resistant to wear, which—possibly by heating—can undergo sufficient plastic deformation, yet does not tend to creep, thus resulting in a reduction in the clamping forces fixing the profiled bars in the supporting rings in the course of time.

After the profiled bar supports have been bent into rings, the latter are closed by the ends of the profiled bar supports being welded to each other. This results in inherent tensions in the supporting rings which, above all, in sorters in which positive and negative pressure pulses are generated in the fiber suspension with the aid of a rotor near the screen basket, may lead to permanent breakages in the supporting rings. To avoid this risk it is proposed, in accordance with the invention, that the welded supporting rings be made to undergo a heat treatment at least in the region of their weld joints in order to reduce or completely eliminate the inherent tensions caused by the welding. If the heat treatment is carried out before the fixing of the profiled bars in the cutouts of the supporting rings, it is also not necessary to limit the heat treatment narrowly to the actual weld joint in order to prevent the clamping forces fixing the profiled bars in the supporting rings from being reduced by the heat treatment.

Metallic profiled bars are preferred, although, in principle, profiled bars made of another material are also conceivable, e.g. made of a sufficiently hard plastic sufficiently resistant to bending stress or of a ceramic material. It is also recommended to use for the profiled bars a material whose stability is greater than the stability of the material used for the supporting rings or the profiled bar supports in order that during the deforming of the profiled bars or supporting rings and the resulting pressing of the edges of the supporting ring or profiled bar support cutouts against the profiled bars, notches will be prevented from occurring in the profiled bars, which with the alternating compression stress on the screen in a sorter with a rotor rotating at the screen inlet side or screen outlet side, could lead to permanent breakages on the profiled bars.

Further features of particularly preferred embodiments of the inventive screen and the inventive manufacturing method will be apparent from the attached claims and/or the following description and the appended drawings of two particularly advantageous embodiments of the inventive screen and the manufacture thereof. The drawings show:

Figure 2:
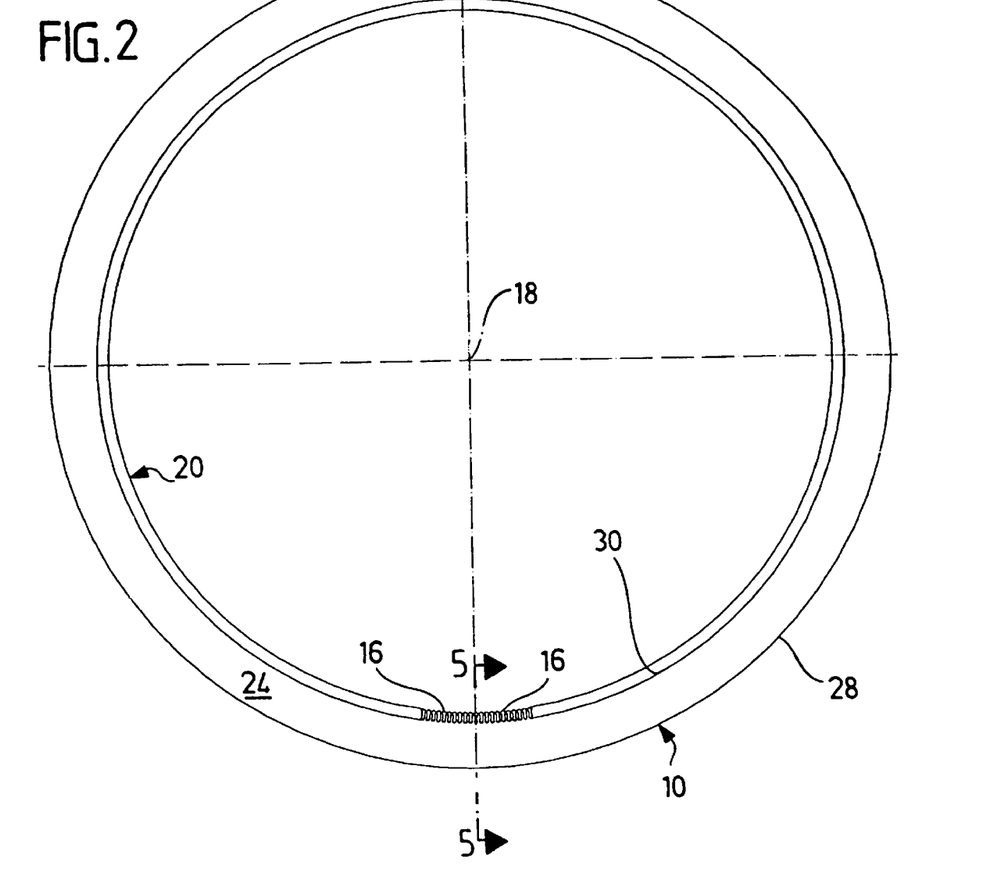
FIG. 2 a plan view of the bar screen basket shown in FIG. 1, in which, again, only a few profiled bars were drawn.
Figure 5:
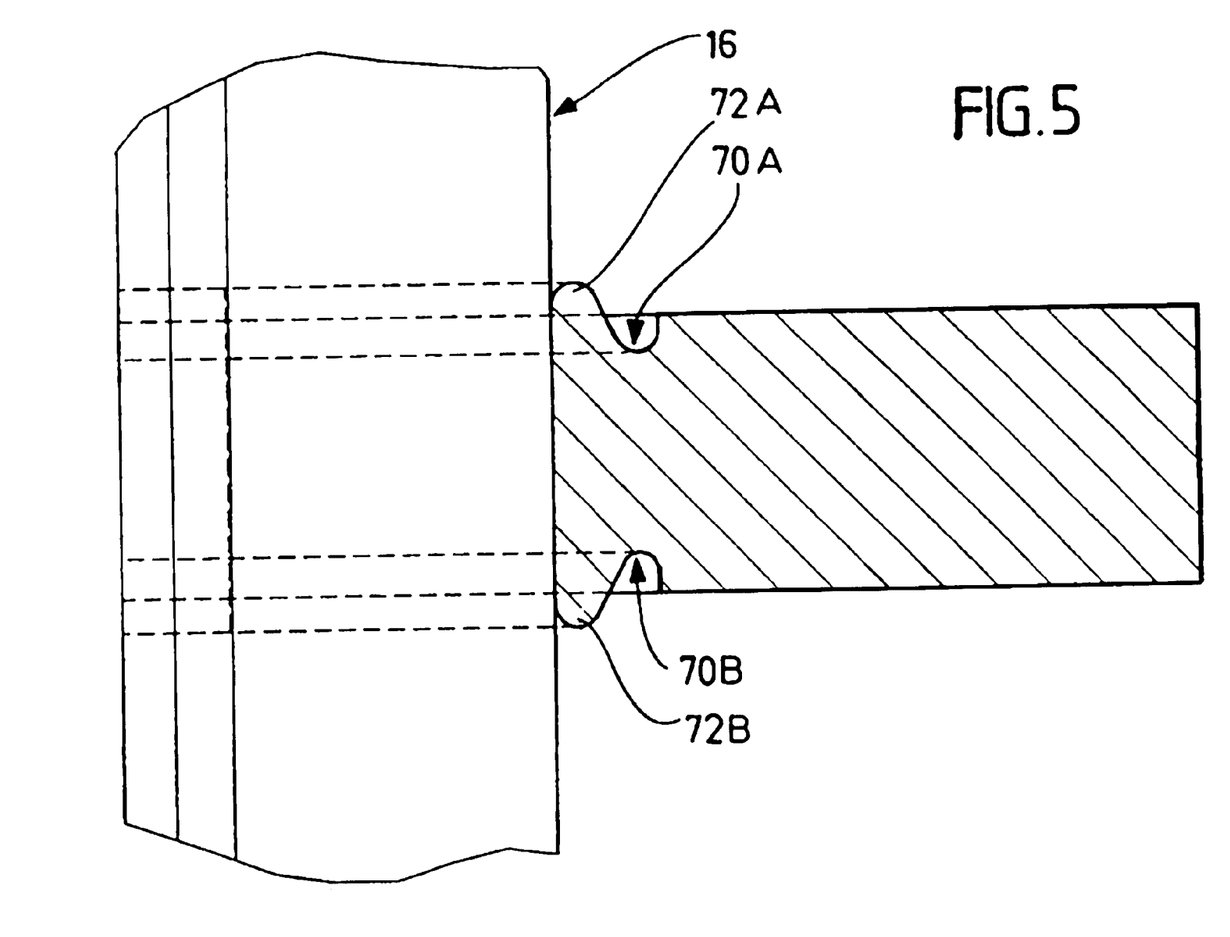
FIG. 5 a section taken on line 5—5 in FIG. 4.
Figure 6:
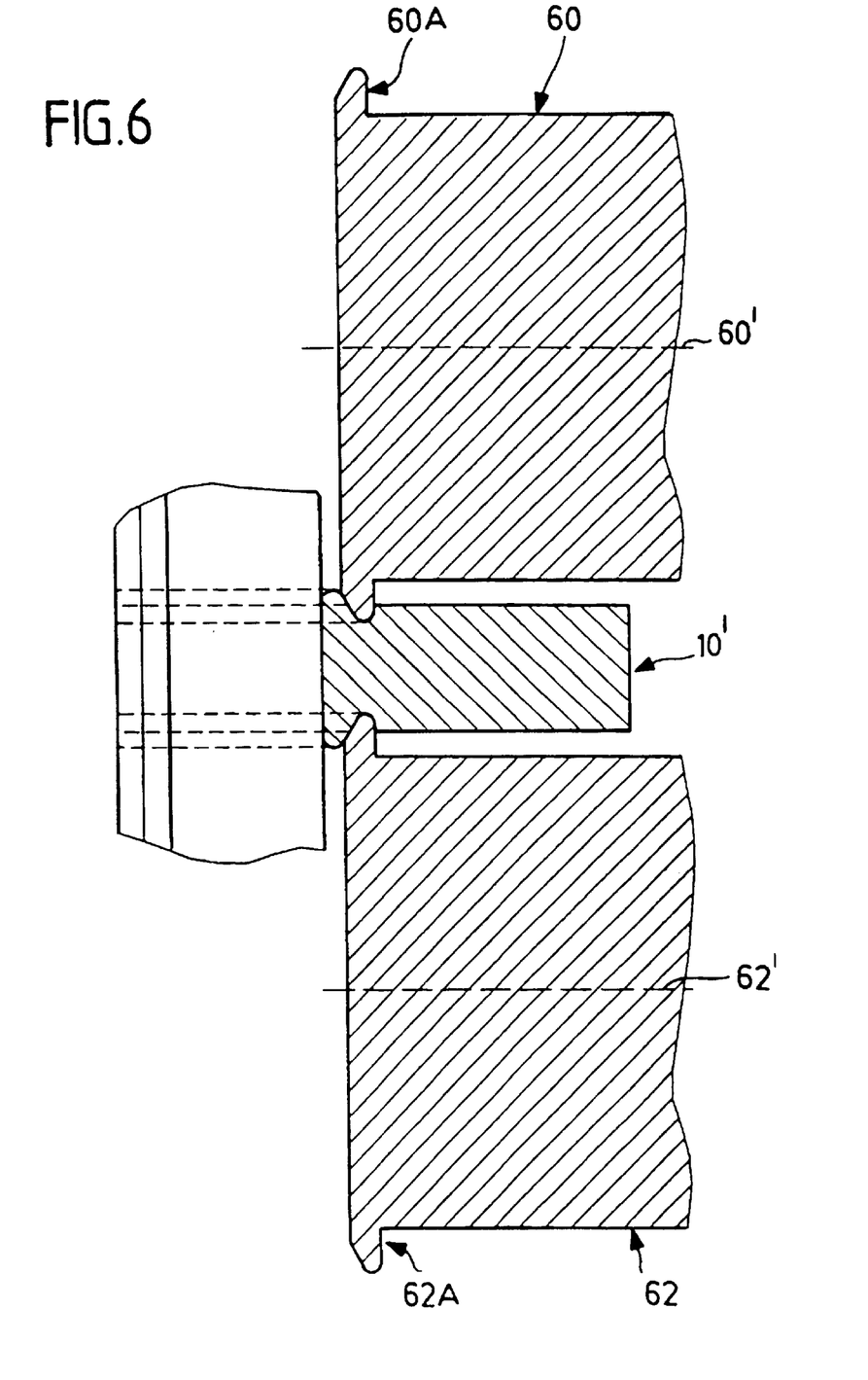
FIG. 6 an illustration corresponding to FIG. 5, but including two rolling tools for the invention plastic deformation of the profiled bar support.

It is first pointed out, in addition, that FIG. 5 could also represent a section corresponding to line 5—5 in FIG. 2, and FIG. 6, consequently, the rolling tools acting upon the already closed supporting ring.

DETAILED DESCRIPTION OF PREFERRED EMBODIMENTS

Figure 1:
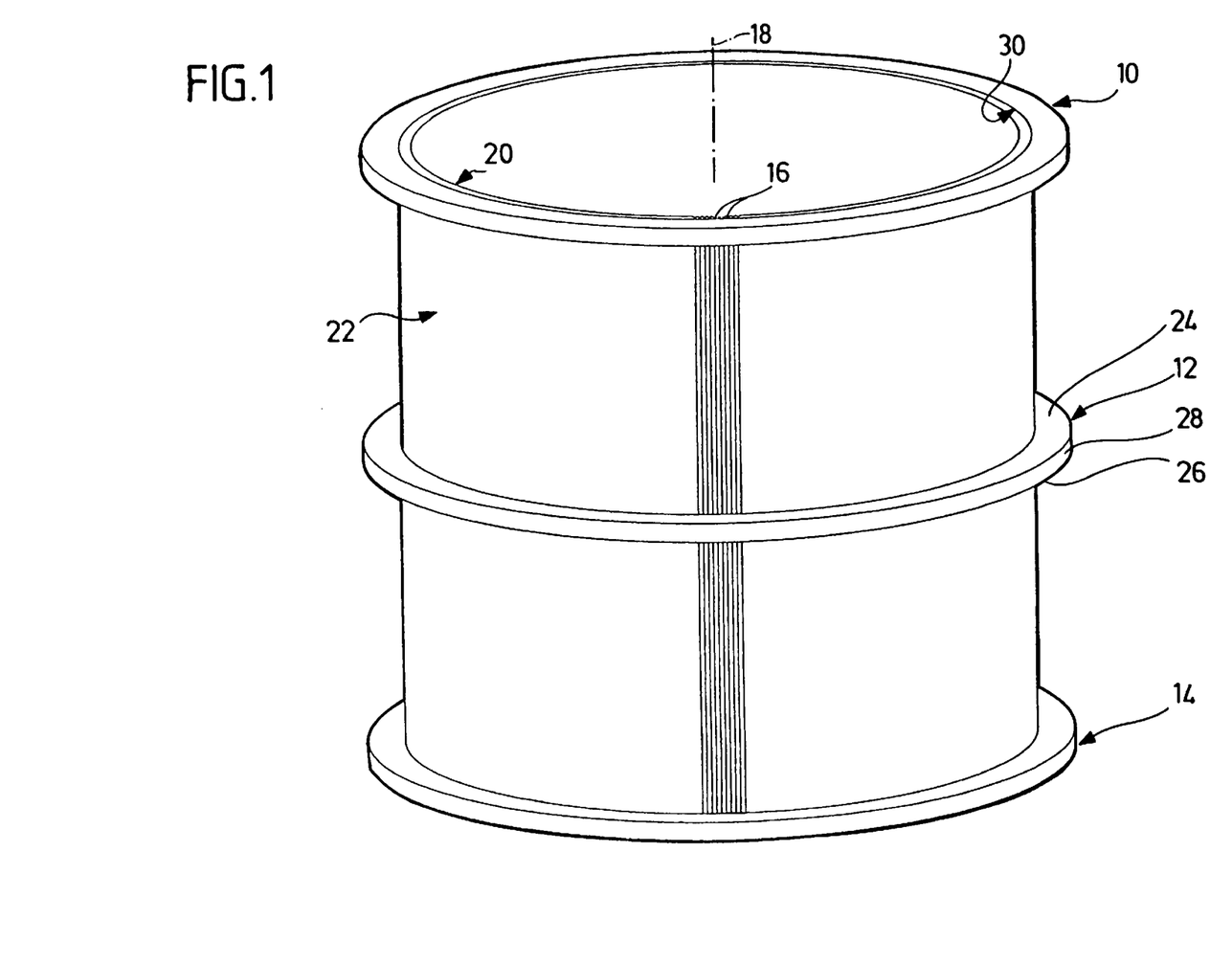
FIG. 1 a perspective and mainly schematic illustration of the first embodiment of the inventive bar screen basket showing only a few profiled bars.

FIGS. 1 and 2 show that the bar screen basket consists of three supporting rings 10, 12 and 14 and of a plurality of profiled bars 16, with the latter extending parallel to a screen axis 18 and the supporting rings lying in planes perpendicular to the screen axis. As will be apparent from the following, in the illustrated screen basket the profiled bars 16 are designed and arranged such that the inlet side 20 for the fiber suspension to be sorted is located at the inner circumference of the screen basket, the outlet side 22 for the fiber suspension which has passed through the screen basket at the outer circumference thereof. Each of the, in particular, identically designed supporting rings 10, 12 and 14 has a cross section in the form of a flat rectangle and possesses an upper flat side 24, a lower flat side 26, an outer edge 28 and an inner edge 30.

Figure 3:
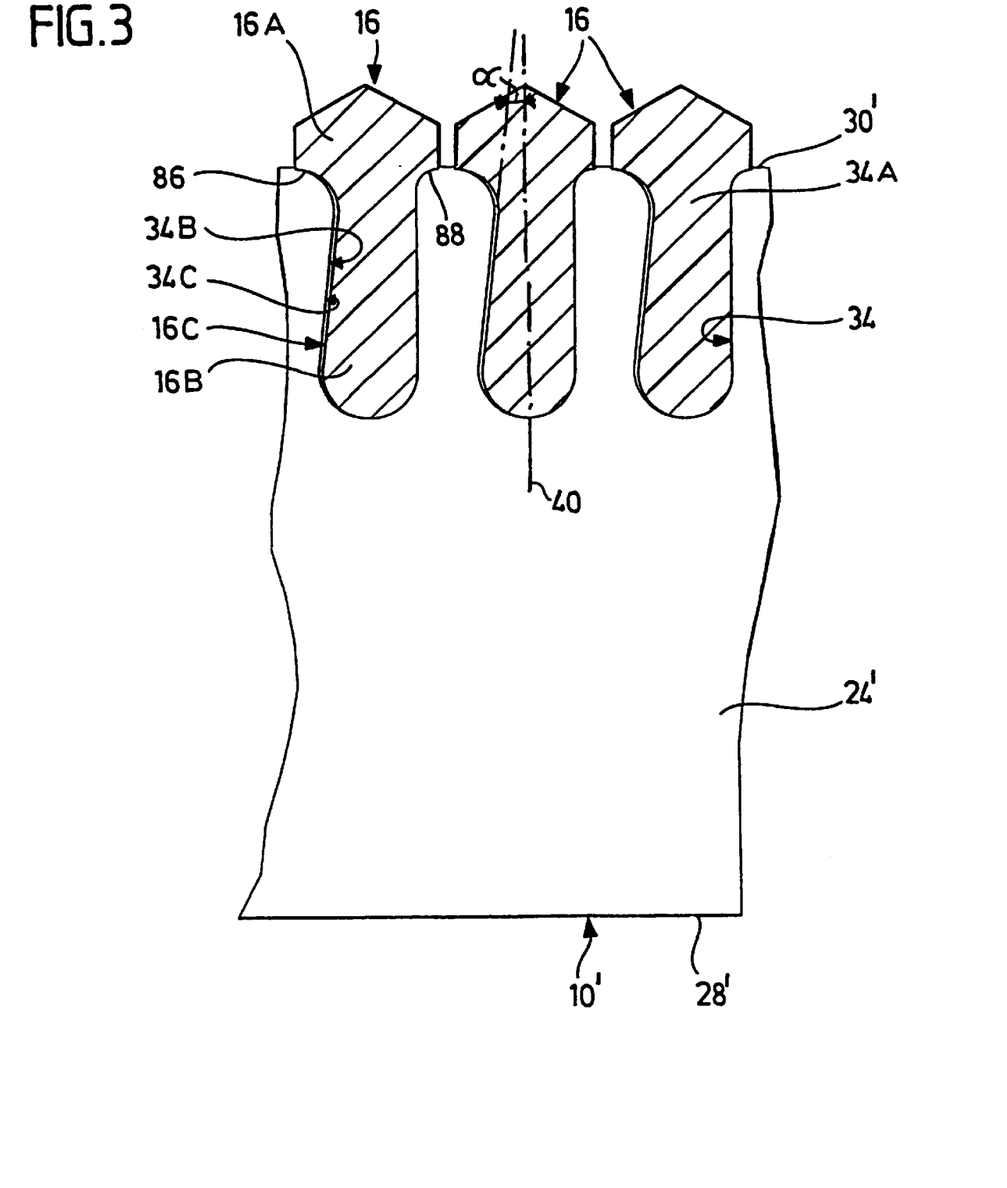
FIG. 3 a plan view of a relatively short section of a still stretched or straight profiled bar support with three profiled bars shown in cross section, which have already been pushed into cutouts in the profiled bar support, but have not yet been fixed thereon, i.e., prior to the inventive plastic deformation of the profiled bar support.

FIG. 3 shows a short section of a still straight profiled bar support 10' which is later to be bent into the closed supporting ring 10. The first edge of the profiled bar support 10' corresponding to the inner edge 30 of the supporting ring 10 was designated 30', the second edge of the profiled bar support 10' corresponding to the outer edge 28 of the supporting ring 10 was designated 28', and the upper flat side of the profiled bar support visible in FIG. 3 was designated 24'. For each profiled bar 16, the profiled bar support 10' has a cutout 34 into which a profiled bar 16 can be pushed in the direction of the longitudinal extent of the profiled bar. All cutouts 34 are to have the same configuration and the same dimensions, and the same applies to the profiled bars 16. The cross section of a profiled bar is approximately mushroom-shaped with a mushroom head forming a first cross-sectional end region 16A and an approximately club-shaped mushroom foot forming a second cross-sectional end region 16B, with the configuration of the second cross-sectional end region 16B corresponding to the configuration of the cutout 34 if one disregards a relatively small play of the profiled bar 16 in the cutout 34 recognizable in FIG. 3.

The shape of the cutout 34 whose flanks extend perpendicularly to the upper and lower flat sides of the profiled bar support 10' is designed such that the cutout 34 has a constriction 34A. Between the latter and the end of the cutout 34 facing the second edge 28' of the profiled bar support 10' the cutout 34 forms an undercut 34B in the region of which the edge of the cutout 34 has an approximately straight flank 34C which forms with a plane designated 40 in FIG. 3 and extending perpendicularly to the drawing plane of FIG. 3 an acute angle α which opens in the direction towards the second edge 28' of the profiled bar support 10'. After the profiled bar support 10' has been reshaped into the closed supporting ring 10, the plane 40 forms a diameter plane of the bar screen basket.

The second cross-sectional end region 16B of the profiled bars 16 forms a projection 16C which engages the undercut 34B of the associated cutout 34 and so even prior to the inventive deformation of the profiled bar support 10', the profiled bar 16 cannot be pulled upwards out of the cutout 34 in accordance with FIG. 3. As FIG. 3 also shows, the outer circumference of each profiled bar 16 already lies in the region of the second cross-sectional end region 16B of the profiled bar prior to the inventive deformation of the profiled bar support 10' overall at least almost free of play against the edge of the associated cutout 34 with the exception of a relatively narrow gap between the flank 34C of the cutout 34 and the projection 16C of the profiled bar. This gap is closed by the inventive deformation of the profiled bar support 10' in the following way:

An upper pressure roll 60 is pressed from above and a lower pressure roll 62 from below (see FIG. 6) against the profiled bar support 10' (in the given case, against the supporting ring 10). The pressure rolls are freely rotatable about axes 60' and 62', respectively, parallel to one another and to the flat sides of the profiled bar support 10' or the supporting ring 10. (The axes 60', 62' also extend perpendicularly to the longitudinal direction of the profiled bar support 10' and radially to the screen axis 18). By controlling the pressure with which they are pressed in accordance with FIG. 6 in the vertical direction against the profiled bar support 10' or the supporting ring 10, the pressure rolls 60 and 62 are guided past all of the profiled bars 16 along the profiled bar support 10' or around the supporting ring 10 and thus produce with their displacement ribs 60A and 62A, respectively, recognizable in FIG. 6, at the upper and lower flat sides of the profiled bar support 10' or the supporting ring 10 (the same naturally applies accordingly to the supporting ring 12 and the supporting ring 14) in the immediate vicinity of the profiled bars 16 a channel 70A and 70B, respectively, and owing to the inventive configuration of the profile of the displacement rib 60A and 62A, respectively, recognizable in FIG. 6, a bead 72A and 72B, respectively, cast up against the profiled bars 16 so that owing to this displacement of material, the profiled bars 16 are displaced upwards to a slight extent in accordance with FIG. 3 (including the lower edge area of each of the cutouts 34 in accordance with FIG. 3), and, in this way, as will be apparent from FIG. 4, the previously present gap between the flank 34C of the cutouts 34 and the projection 16C of the profiled bars 16 is closed with the result that the profiled bars are clamped in the cutouts. The angle a recognizable in FIG. 3 is expediently of such dimensions that after the inventive deformation self-locking occurs between the flank 34C and the flank of the projection 16C pressed against the latter.

Figure 4:
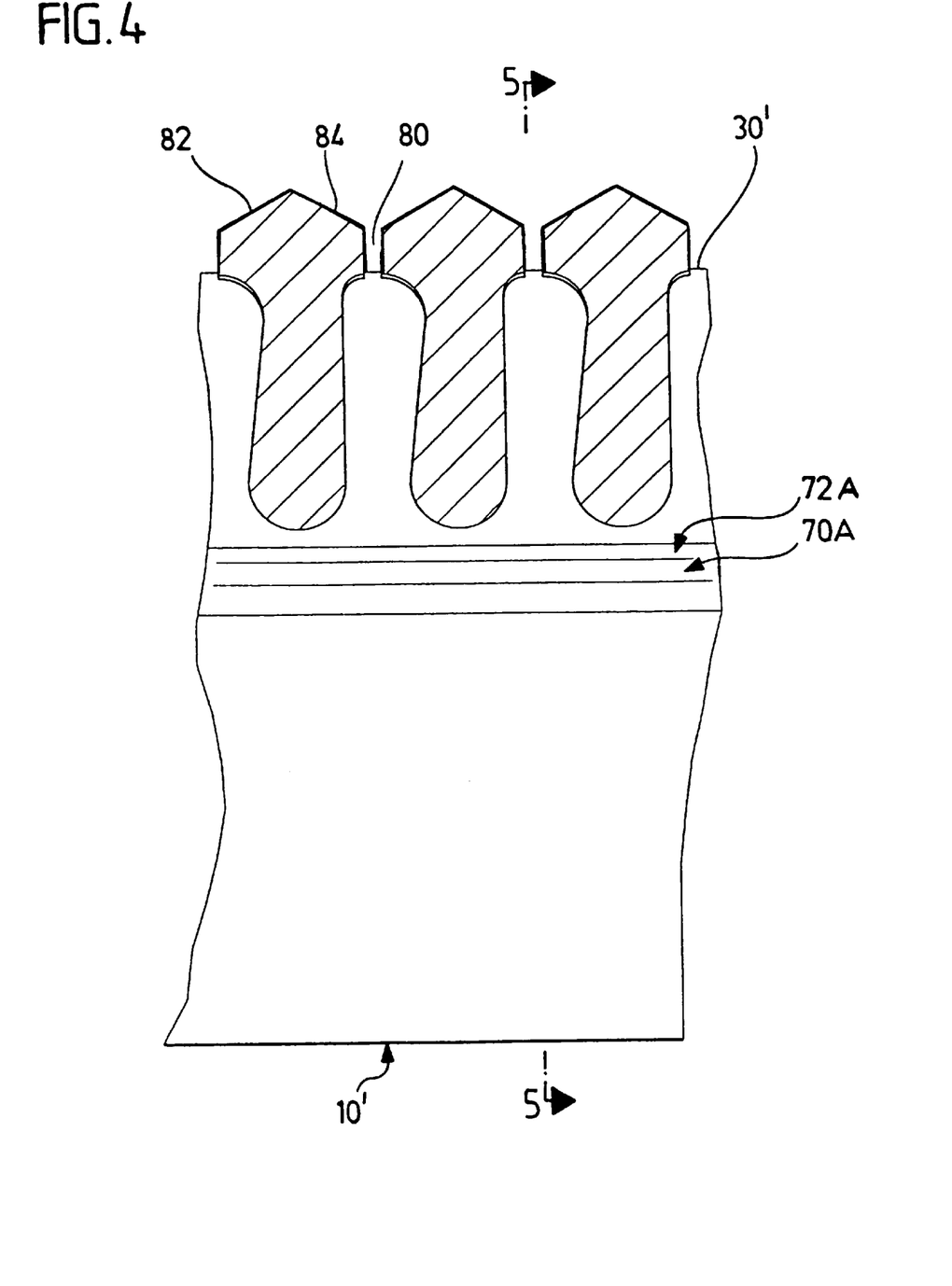
FIG. 4 an illustration corresponding to FIG. 3, but after the inventive plastic deformation of the profiled bar support for the purpose of displacement of profiled bar support material in the direction towards the profiled bars.

If one assumes that FIG. 4 represents a section taken from FIG. 2 and does not show the profiled bar support 10', but already the upper supporting ring, one recognizes that also after reshaping of the profiled bar supports into closed supporting rings, the profiled bars 16 form between them slot-shaped screen openings 80 which extend parallel to the screen axis 18 and are open between the supporting rings 10, 12 and 12, 14, i.e., the inlet side 20 communicates via the screen openings 80 with the outlet side 22 of the screen basket.

In the first cross-sectional end regions 16A, the profiled bars 16 are provided at the screen inlet side 20 with inclined flanks 82 and 84 and with rear flanks 86 and 88. The inclined flanks 82 and 84 form with the plane 40 recognizable in FIG. 3 acute angles which may be of the same or different size, and the rear flanks 86 and 88 lie, in particular, prior to performance of the inventive deformation, against the first edge 30' of the profiled bar support 10'.

In sorters in which a rotor rotates in a known way in the fiber suspension to be sorted adjacent to the inlet side 20 of the screen basket, the first cross-sectional end regions 16A of the profiled bars 16 generate, in particular, with their inclined flanks 82 and 84 in the fiber suspension to be sorted microturbulences which counteract the formation of a considerable fiber fleece at the screen inlet side 20 and a clogging of the screen openings 80.

As extremely fine screen openings are required for the processing of fiber suspensions in modern sorters and high material densities (high fiber component of the fiber suspensions to be processed) are used, it is also necessary to generate with the above-mentioned rotor of the sorter high pressure and suction pulses in the fiber suspension in order to counteract clogging of the screen openings. These high pressure and suction pulses result in correspondingly high forces acting on the profiled bars, and, therefore, these must permanently have a firm hold in the supporting rings.

This requirement can be met in a simple way with the present invention as the profiled bars are firmly clamped in the cutouts of the supporting rings by the inventive displacement of material, more particularly, also in the case of large screen basket diameters and, consequently, correspondingly small bendings when reshaping the profiled bar supports into the supporting rings.

Figure 7:
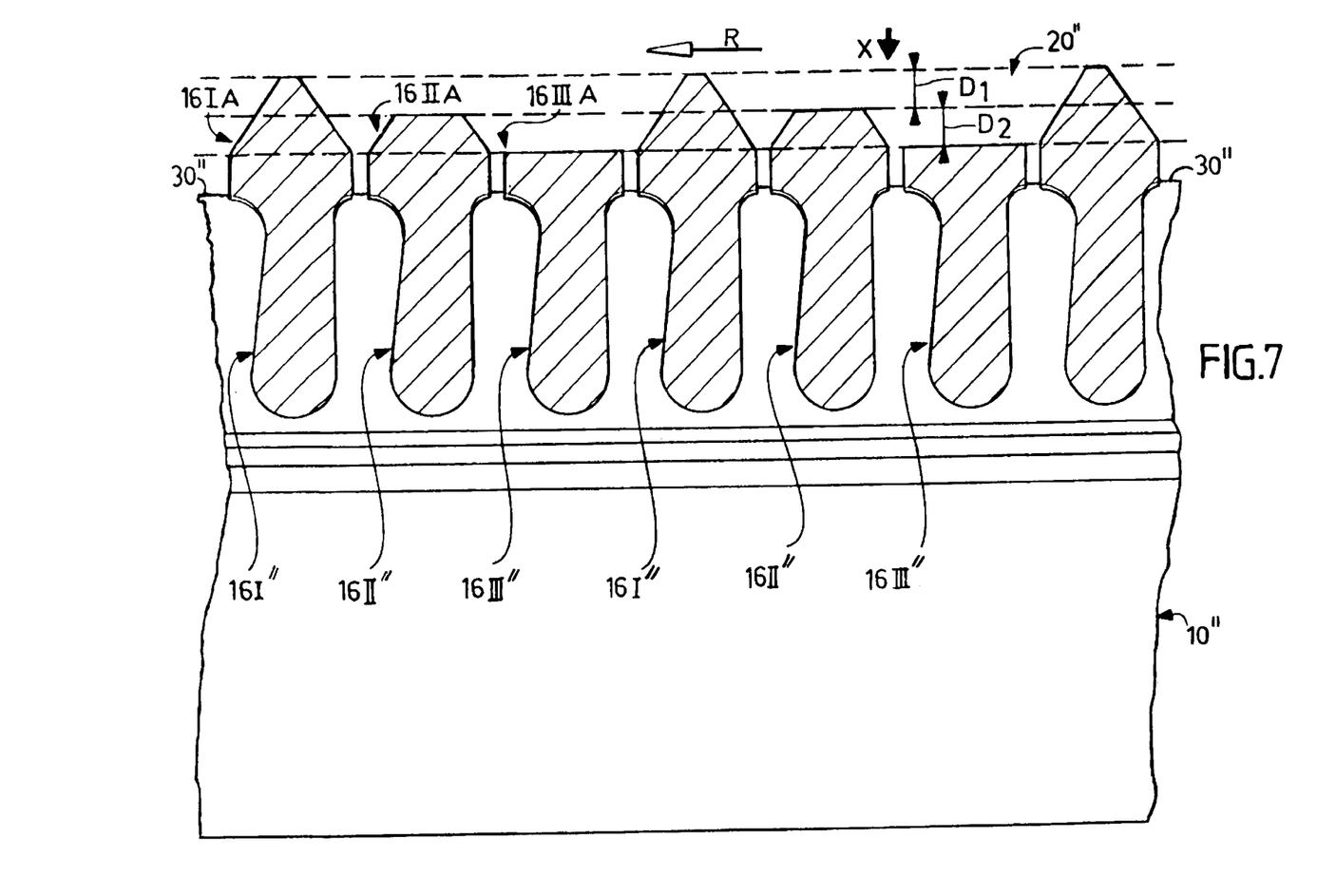
FIG. 7 an illustration of the second embodiment corresponding to FIG. 4.
Figure 8:
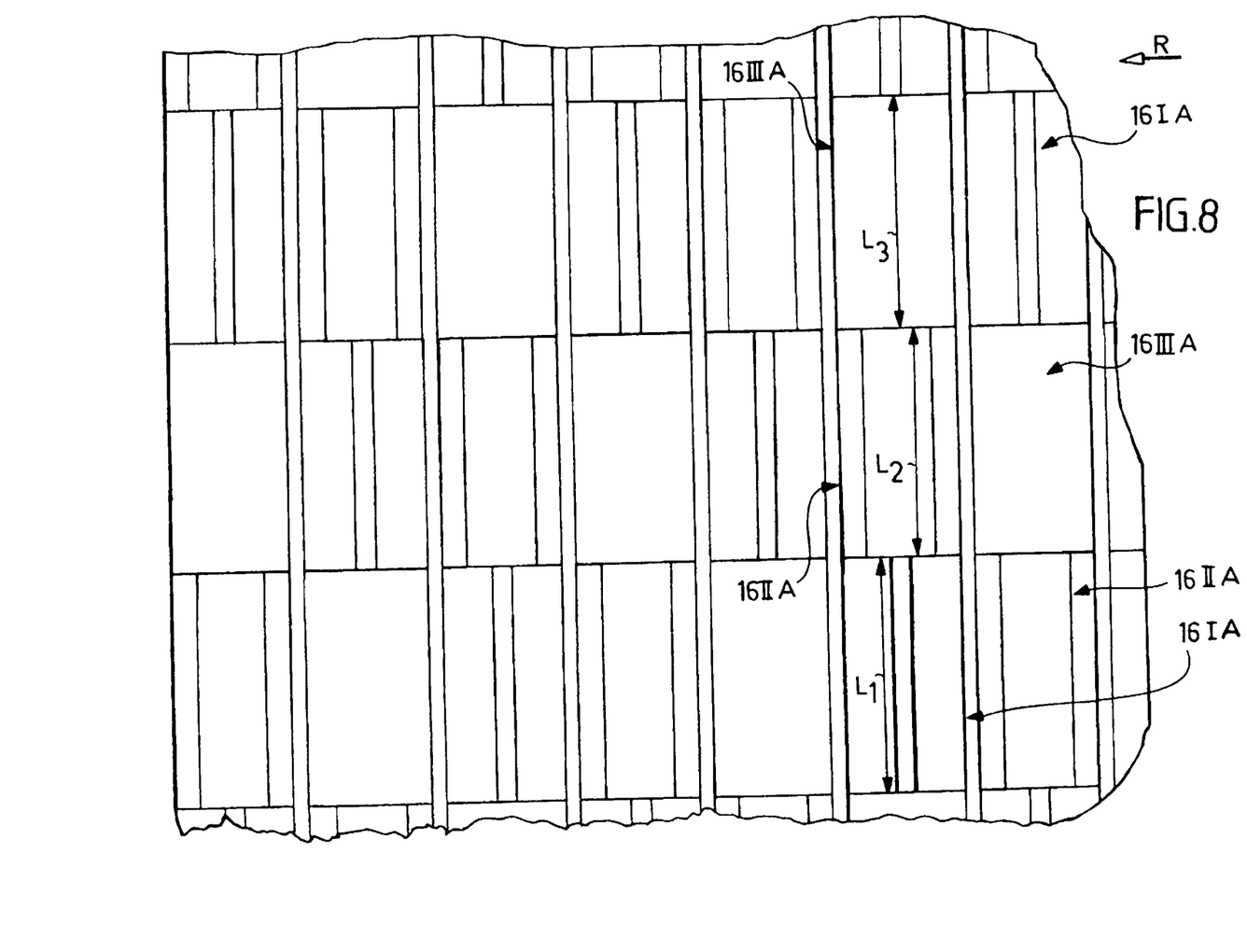
FIG. 8 part of an unwinding of the second embodiment of the inventive bar screen basket, more specifically, in a view of its inlet side seen in the direction of arrow X from FIG. 7.
Figure 9:
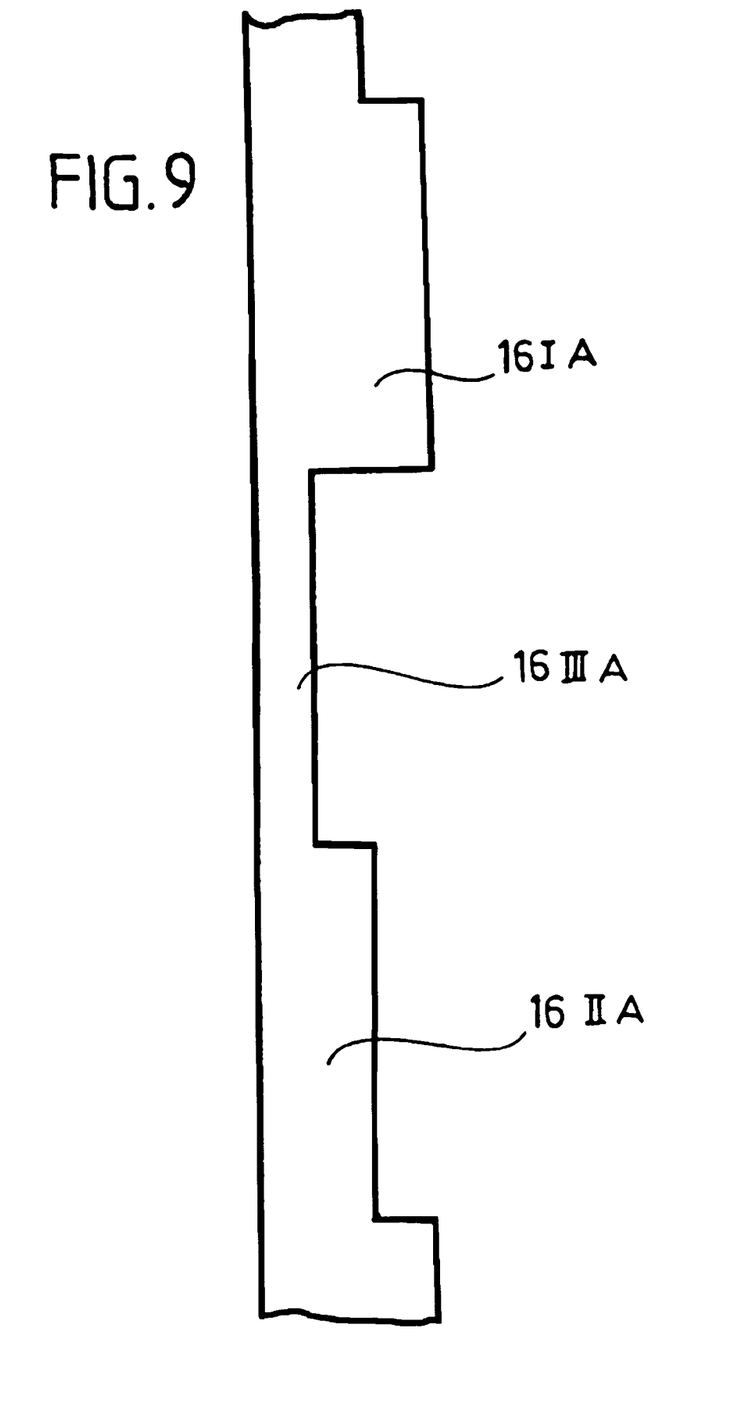
FIG. 9 a side view of the region of a profiled bar of the second embodiment projecting over the supporting rings, seen in the direction of arrow R from FIG. 7, but wherein only part of the length of this profiled bar is shown.

The second embodiment shown in FIGS. 7 to 9 differs from the first embodiment according to FIGS. 1 to 6 only in the design of the first longitudinal sides of the profiled bars facing away from the screen outlet side, more specifically, in the design of the first cross-sectional end regions of the profiled bars with which the latter project over those edges of the supporting rings which face the screen inlet side. Therefore, in FIGS. 7 to 9, as far as possible, the same reference numerals were used as in FIGS. 1 to 6, but with the addition of two primes.

The illustration in FIG. 7 is intended to correspond to the illustration in FIG. 4, but with the modification that FIG. 7 does not show a profiled bar support which is still straight, but the unwinding of a circular ring-shaped supporting ring which, consequently, was illustrated in FIG. 7 as a straight element.

In the second embodiment, a supporting ring 10" holds a series of profiled bars 16I", 16II" and 16III", which project with their first cross-sectional end regions 16IA, 16IIA and 16IIIA over the edge 30" of the supporting ring 10" facing the screen inlet side 20" (see FIG. 7).

As is apparent from FIGS. 8 and 9, each of the profiled bars 16I", 16II" and 16III" has in the longitudinal direction of the bar a periodically repeated series of cross-sectional end regions 16IA, 16IIA and 16IIIA following one another in the longitudinal direction of the bar and hence in the longitudinal direction of the bar a periodically repeated series of sections with a varying projection following one another in the longitudinal direction of the bar. The profiled bars 16I", 16II" and 16III" thus differ from one another essentially only in that the series of profiled bar sections formed by the cross-sectional end regions 16IA, 16IIA and 16IIIA are offset in relation to one another in the longitudinal direction of the bar.

Furthermore, in the second embodiment, the screen has several identical groups of profiled bars following one another in the circumferential direction of the screen, each of these groups being formed by three profiled bars, namely a profiled bar 16I", a profiled bar 16I" and a profiled bar 16III", which follow one another in the above-indicated sequence.

In FIGS. 7 and 8, the arrow R was drawn to indicate that direction in which the fiber suspension to be sorted flows along the inlet side 20" of the screen, but in a sorter with a rotor the arrow R also indicates the direction of rotation of the rotor, in particular, that direction in which blades or so-called cleaning wings of the rotor pass the inlet side 20″ of the screen. Thus, in the illustrated embodiment, the first cross-sectional end regions always follow one another in the sequence 16IIIA, 16IIA and 161A in the direction R in an axial screen section.

As shown in FIG. 7, the first cross-sectional end regions 16IA, 16IIA and 16IIIA project to a varying extent into the fiber suspension to be sorted, i.e., they project to a varying extent over the inner edges 30″ of the supporting rings. The differences in the projections were designated $D_1$ and $D_2$ in FIG. 7, and $D_1$ and $D_2$ can be different in size or equal in size—$D_1$ and $D_2$ values of approximately equal size being preferred. In particular, in screen baskets for so-called pressure sorters $D_1$ and $D_2$ are at the most equal to 1 mm, preferably 0.5 to 0.8 mm, and, in particular, approximately 0.5 to approximately 0.6 mm. In FIG. 8, the lengths of the cross-sectional end regions 16IA, 16IIA and 16IIIA measured in the direction of the screen axis or in the longitudinal direction of the profiled bar were designated $L_1$, $L_2$ and $L_3$. In the illustrated, preferred embodiment $L_1$, $L_2$ and $L_3$ are of identical size, which means that the cross sections of the cross-sectional end regions 16IA, 16IIA and 16IIIA are not to change over their axial length, but this obviously does not necessarily have to be the case. In a screen of approximately circular-cylindrical configuration, $L_1$, $L_2$, $L_3$ are each preferably approximately 15% to approximately 30% of the axial length of the screen, in particular, equal to ⅕ to ¼ of the screen length. With an axial screen length of, for example, 800 mm, $L_1$, $L_2$, $L_3$ thus each lie in a range of 150 to 200 mm.

As is apparent from FIG. 8, the cross-sectional end regions or profiled bar sections 16IA, 16IIA and 16IIIA which are of different height or project to a varying extent are arranged in accordance with the invention in a special pattern on the inlet side 20″ of the inventive screen such that a fiber suspension to be sorted flowing past the screen inlet side in the direction of arrow R in FIG. 8 contains an axial flow component or an increased axial flow component in the direction of the screen axis, i.e., is deflected downwards in accordance with FIG. 8, as there is adjacent to a row of profiled bar sections 16IIIA, 16IIA, and 16IA which follow one another in the direction R and project to an increasing extent in the direction R, in the downwardly adjoining axial screen section a row of like profiled bar sections, but which is offset in relation to the first-mentioned row opposite to the direction R, more particularly, by the dimension of the so-called division of the screen, i.e., by the spacing of the longitudinal center planes of two adjacent profiled bars measured in the direction R. Such an offset is preferred although, in principle, also twice as large an offset is possible.

What is claimed is:

1. Screen for fiber suspensions having a shape which is essentially rotationally symmetrical in relation to a screen axis, a first circumferential side of said screen forming an inlet side and the other, second circumferential side thereof forming an outlet side of said screen for the fiber suspension, with a series of profiled bars extending transversely to the circumferential direction of the screen, said profiled bars being arranged at equal spacings from one another in the circumferential direction of the screen and forming slot-shaped screen openings between them, the cross sections of said profiled bars each having an elongate shape with a first end region facing away from the screen outlet side and a second end region facing away from the screen inlet side, and with at least two supporting rings made of plastically deformable material, said supporting rings lying in planes extending perpendicularly to said screen axis and being arranged in spaced relation to one another in the direction of said screen axis, each of said supporting rings having in its first edge region facing said screen inlet side a series of cutouts open at their edge towards said screen inlet side, the shape of said cutouts—viewed in the direction of said screen axis—corresponding to the configuration of the second cross-sectional end regions of said profiled bars lying in said cutouts, and forming at a radial spacing from the first edge of said supporting ring facing said screen inlet side an undercut in which a projection of said profiled bar cross section engages so that said profiled bars are held positively in a radial direction in relation to said screen axis and in the circumferential direction of said screen with their second cross-sectional end regions in said supporting ring cutouts, said profiled bars projecting in a radial direction over the first edges of said supporting rings, and being clamped with their second cross-sectional end regions in said supporting ring cutouts as a result of a plastic deformation of said supporting rings, wherein said supporting rings have on the side of said profiled bars facing said screen outlet side such deformed regions that as a result of a displacement of supporting ring material in the direction towards said screen inlet side said profiled bar projections are pressed in this direction against said undercuts.

2. Screen as defined in claim 1, wherein said deformed supporting ring regions comprise pressed-in recesses.

3. Screen as defined in claim 2, wherein said recesses are in the form of ring-shaped grooves extending around said screen axis.

4. Screen as defined in claim 2, wherein said recesses lie on the sides of said supporting rings facing the axial ends of said screen.

5. Screen as defined in claim 1, wherein said supporting rings are provided with deformed regions on both of their sides facing said axial screen ends.

6. Screen as defined in claim 5, wherein—in the direction of said screen axis—said deformed regions of a supporting ring lie opposite each other.

7. Screen as defined in claim 3, wherein said grooves are rolled regions.

8. Screen as defined in claim 1, wherein said profiled bars are metallic bars.

9. Screen as defined in claim 1, wherein said screen is cylindrical.

10. Screen as defined in claim 1, wherein the inner circumferential side of said screen forms the inlet side thereof.

11. Screen as defined in claim 1, wherein all profiled bars have the same cross-sectional shape and all supporting ring cutouts the same configuration.

12. Screen as defined claim 1, wherein the first cross-sectional end regions of said profiled bars are of such configuration that they generate microturbulences in a fiber suspension rotating at said screen inlet side.

13. Screen as defined in claim 12, wherein the first cross-sectional end regions of said profiled bars have flanks inclined in relation to a diameter plane of said screen, said flanks forming the legs of an at least approximate isosceles triangle whose angle bisector lies at least approximately in said diameter plane.

14. Screen as defined in claim 1, wherein—viewed in the direction of said screen axis—said undercut of said supporting ring cutouts forms a flank on that side of the supporting ring cutout constriction formed by said undercut which faces said screen outlet side, said flank being inclined in relation to a diameter plane of said screen running through this constriction at such an acute angle opening towards said screen outlet side that self-locking occurs between this flank and a flank of said profiled bar projection pressed against said flank.

15. Screen as defined in claim 1, wherein the second end region of the profiled bar cross section is of approximately club-shaped configuration.

16. Screen as defined in claim 1, wherein the first end region of the profiled bar cross section is of approximately mushroom-head-shaped configuration with flanks facing said screen outlet side and forming cooperating stops with the first edge of the pertinent supporting ring.

17. Screen as defined in claim 1, wherein said supporting rings consist of a material which is different from that of said profiled bars.

18. Screen as defined in claim 17, wherein the material of said profiled bars has a different stability than that of the material of said supporting rings.

19. Screen as defined in claim 18, wherein the stability of said profiled bar material is greater than the stability of said supporting ring material.

20. Screen for fiber suspensions, in particular, as defined in claim 1, having a shape which is essentially rotationally symmetrical in relation to a screen axis, a first circumferential side of said screen forming an inlet side and the other, second circumferential side thereof forming an outlet side of said screen for the fiber suspension, with a series of profiled bars extending transversely to the circumferential direction of the screen, said profiled bars being arranged at equal spacings from one another in the circumferential direction of the screen and forming slot-shaped screen openings between them, the cross sections of said profiled bars each having an elongate shape with a first end region facing away from the screen outlet side and a second end region facing away from the screen inlet side, and with at least two supporting rings lying in planes extending perpendicularly to said screen axis and being arranged in spaced relation to one another in the direction of said screen axis, each of said supporting rings having in its first edge region facing said screen inlet side a series of cutouts open at their edge towards said screen inlet side, the shape of said cutouts—viewed in the direction of said screen axis—corresponding to the configuration of the second cross-sectional end regions of said profiled bars lying in said cutouts, and said profiled bars being held in a radial direction in relation to said screen axis and in the circumferential direction of the screen with their second cross-sectional end regions in said cutouts, said profiled bars projecting in a radial direction over the first edges of said supporting rings, wherein profiled bars arranged one behind the other in the circumferential direction of the screen are of such different configuration at their first longitudinal sides facing away from said screen outlet side that said profiled bars impart an axial flow component oriented in the direction of said screen axis to a fiber suspension flowing at said screen inlet side in the circumferential direction of the screen.

21. Screen as defined in claim 20, wherein profiled bars arranged so as to follow one another immediately in the circumferential direction of the screen are of such different configuration at their first longitudinal sides at least in one axial section of said screen that said profiled bars impart an axial flow component oriented in the direction of said screen axis to a fiber suspension flowing at said screen inlet side in the circumferential direction of the screen.

22. Screen as defined in claim 20, wherein several identical groups of profiled bars follow one another in the circumferential direction of the screen, and the profiled bars of a group differ from one another with respect to the configuration of their first longitudinal sides.

23. Screen as defined in claim 20, wherein said profiled bars project at their first longitudinal sides section-wise to a varying extent over the first supporting ring edges.

24. Screen as defined in claim 23, wherein each profiled bar has in the longitudinal direction of the bar a periodically repeated series of sections of varying projection following one another in the longitudinal direction of the bar.

25. Screen as defined in claim 24, wherein the series of profiled bar sections contains the same number of profiled bar sections on each profiled bar, and the projections of profiled bar sections of the same kind are identical.

26. Screen as defined in claim 25, wherein the length of all profiled bar sections measured in the longitudinal direction of the bar is identical.

27. Screen as defined in claim 26, wherein in axial screen sections whose axial length is the same as that of the profiled bar sections, different profiled bar sections follow one another in the circumferential direction of the screen.

28. Screen as defined in claim 27, wherein in each axial screen section, the profiled bar sections are offset in the circumferential direction of the screen in relation to identical profiled bar sections of adjacent axial screen sections such that the profiled bar sections impart an axial flow component oriented in the direction of the screen axis to a fiber suspension flowing at the inlet side of the screen in the circumferential direction of the screen.

29. Method for the manufacture of a screen for fiber suspensions having a shape which is essentially rotationally symmetrical in relation to a screen axis, a first circumferential side of said screen forming an inlet side and the other, second circumferential side thereof forming an outlet side of said screen for the fiber suspension, with a series of profiled bars extending transversely to the circumferential direction of the screen, said profiled bars being arranged at equal spacings from one another in the circumferential direction of the screen and forming slot-shaped screen openings between them, the cross sections of said profiled bars each having an elongate shape with a first end region facing away from the screen outlet side and a second end region facing away from the screen inlet side, and with at least two ring-shaped profiled bar supports made of plastically deformable material, said profiled bar supports lying in planes extending perpendicularly to said screen axis and being arranged in spaced relation to one another in the direction of said screen axis, each of said profiled bar supports having in its first edge region facing said screen inlet side a series of cutouts open at their edge towards said screen inlet side, the shape of said cutouts—viewed in the direction of said screen axis—corresponding to the configuration of the second cross-sectional end regions of said profiled bars lying in said cutouts, and forming at a radial spacing from the first edge of said profiled bar support facing said screen inlet side an undercut in which a projection of the profiled bar cross section engages so that said profiled bars are held positively in a radial direction in relation to said screen axis and in the circumferential direction of the screen with their second cross-sectional end regions in said cutouts of said profiled bar supports and project with their first cross-sectional end regions in a radial direction over the first edges of said profiled bar supports, wherein said profiled bar supports are first provided with cutouts which are somewhat larger than the second cross-sectional end regions of said profiled bars and said profiled bars are then inserted into said profiled bar support cutouts and clamped by a plastic deformation of said profiled bar supports in their cutouts, and wherein said profiled bar supports are made to undergo plastic deformation on that side of said profiled bars which faces away from the first edges of said profiled bar supports such that as a result of a displacement of profiled bar support material in the direction towards the first profiled bar support edges, the profiled bar projections are pressed in this direction against the undercuts.

30. Method as defined in claim 29, wherein said profiled bar supports are only bent into closed rings after said profiled bars have been inserted in said profiled bar support cutouts.

31. Method as defined in claim 29, wherein the plastic deformation of said profiled bar supports causing the displacement of material is carried out on the ring-shaped profiled bar supports.

32. Method as defined in claim 29, wherein the plastic deformation is carried out using a pressure tool.

33. Method as defined in claim 32, wherein for the plastic deformation of a profiled bar support which brings about the displacement of material, said profiled bar support is clamped between a pressure roll and an abutment, and said pressure roll together with said abutment and said profiled bar support are moved relative to one another in the longitudinal direction of said profiled bar support such that said pressure roll passes all profiled bars of the series of profiled bars.

34. Method as defined in claim 33, wherein a pressure roll is also used as abutment.

35. Method as defined in claim 33, wherein a pressure roll with a rib-shaped circumferential profile is used.

36. Method as defined in claim 29, wherein a groove extending along the entire series of profiled bars is produced by the plastic deformation in a surface of said profiled bar support extending transversely to the longitudinal direction of said profiled bars.

37. Method as defined in claim 36, wherein said groove is produced so close to said profiled bars that thus displaced support material forms a bead abutting against said profiled bars.

* * * * *